United States Patent [19]
Hashimoto et al.

[11] Patent Number: 5,510,913
[45] Date of Patent: Apr. 23, 1996

[54] HEAD-UP DISPLAY SYSTEM WHERE POLARIZED LIGHT FROM A DISPLAY IMPINGES ON A GLASS PLATE CONTAINING TWISTED NEMATIC LIQUID CRYSTAL AT THE PLATE'S BREWSTERS ANGLE

[75] Inventors: Chikara Hashimoto, Tokyo; Atsushi Takamatsu, Matsusaka; Hiroyuki Itoh; Takehiro Toyooka, both of Yokohama, all of Japan

[73] Assignees: Central Glass Company, Limited, Ube; Nippon Oil Company, Ltd., Tokyo, both of Japan

[21] Appl. No.: 93,848

[22] Filed: Jul. 20, 1993

[30] Foreign Application Priority Data

Jul. 23, 1992 [JP] Japan .................................. 4-196841

[51] Int. Cl.⁶ .............................. G03H 1/00; G02F 1/13; G02F 1/1335; G02B 5/30
[52] U.S. Cl. ................. 359/37; 359/13; 359/73; 359/487
[58] Field of Search .................. 359/73, 65, 63, 359/37, 487, 13, 14, 15, 494

[56] References Cited

FOREIGN PATENT DOCUMENTS

| | | |
|---|---|---|
| 0380338 | 1/1990 | European Pat. Off. . |
| 0457607A3 | 5/1991 | European Pat. Off. . |
| 61-45218 | 3/1986 | Japan .................................. 359/487 |
| 2-294615 | 5/1989 | Japan . |
| 2-141720 | 5/1990 | Japan . |
| 2-157784 | 6/1990 | Japan .................................. 359/13 |

*Primary Examiner*—Anita Pellman Gross
*Assistant Examiner*—Walter J. Malinowski
*Attorney, Agent, or Firm*—Keck, Mahin & Cate

[57] ABSTRACT

A head-up display system for a vehicle includes a front windshield, a display, a polarizing member and an optical rotatory film. The display for displaying an image on the front windshield to be viewed by a driver of the vehicle is disposed such that light therefrom is incident on the front windshield at an angle which is substantially equal to Brewster's angle. The polarizing member is disposed between the front windshield and the display for polarizing light from the display. The optical rotatory film serves to rotate the plane of polarization of light polarized by the polarizing member. The optical rotatory film installed on the front windshield includes a liquid crystal high polymer which is in twisted nematic orientation under liquid crystal condition and is in glassy condition at a temperature which is lower than liquid crystal transition point. Thus, double image problem can be eliminated with respect to light having a wide range of wavelengths.

10 Claims, 2 Drawing Sheets

HEAD-UP DISPLAY SYSTEM WHERE POLARIZED LIGHT FROM A DISPLAY IMPINGES ON A GLASS PLATE CONTAINING TWISTED NEMATIC LIQUID CRYSTAL AT THE PLATE' S BREWSTERS ANGLE

BACKGROUND OF THE INVENTION

1. Field of the Invention

The present invention relates to a head-up display system which allows, for example, the driver of a car to view a vehicular information, while looking out a front windshield of the car, by projecting the vehicular information in the direction of the front windshield.

2. Description of the Prior Art

Hitherto, various head-up display systems have been proposed. For example, a reflection film has been proposed to be install on a windshield of a car or of an airplane to reflect light rays carrying images of vehicular information. As to the position of the reflection film relative to the windshield, it has been proposed to be directly fixed on the inboard surface of the windshield, to be interposed between two laminated glass sheets of the windshield, or to be put before the windshield. However, an image of a dashboard tends to be undesirably reflected by the reflection film and thus is viewed by the driver due to its high reflectance. This lowers the display quality of the head-up display system.

As another example, holography technique has been proposed to be used in the head-up display system. However, if this technique is used, it is necessary to employ a complicated optical device. Furthermore, there are unsolved problems such as image distortion and chromatic aberration.

As another example, it has been proposed to reflect light rays from the surface of a front windshield without using a reflection film. However, there is provided a problem of double image phenomenon or of ghost. To eliminate this problem, there are provided proposals such as JP-A-2-141720 and JP-A-2-294615. JP-A-2-141720 discloses a head-up display system having a phase film such as a $\lambda/2$ film. This film serves to rotate the plane of polarization of polarized light having a particular wavelength of $\lambda$. JP-A-2-294615 discloses another head-up display system having a transparent birefringent film, for example, of polyethylene terephthalate. According to these proposals, the plane of polarization of polarized light having a particular wavelength can be rotated by 90 degrees so as to eliminate the double image problem. However, the plane of polarization of polarized light having a wide range of wavelengths can not be rotated by these proposals.

SUMMARY OF THE INVENTION

It is therefore an object of the present invention to provide an improved head-up display system in which the plane of polarization of polarized light having a wide range of wavelengths throughout visible light region can be rotated so as to eliminate the double image problem.

According to the present invention, there is provided a head-up display system for a vehicle, comprising:

a front windshield of the vehicle;

means for displaying an image on said front windshield to be viewed by a driver of the vehicle, said displaying means being disposed such that light therefrom is incident on said front windshield at an angle which is substantially equal to Brewster's angle;

means for polarizing light from said displaying means, said polarizing means being disposed between said front windshield and said displaying means; and an optical rotatory film for rotating a plane of polarization of light polarized by said polarizing means, said optical rotatory film being installed on said front windshield, said optical rotatory film comprising a liquid crystal high polymer which is in twisted nematic orientation under liquid crystal condition and is in glassy condition at a temperature which is lower than liquid crystal transition point thereof.

According to the present invention, display quality is improved and detailed patterns can be displayed.

DESCRIPTION OF THE PREFERRED EMBODIMENTS

Figure 1:
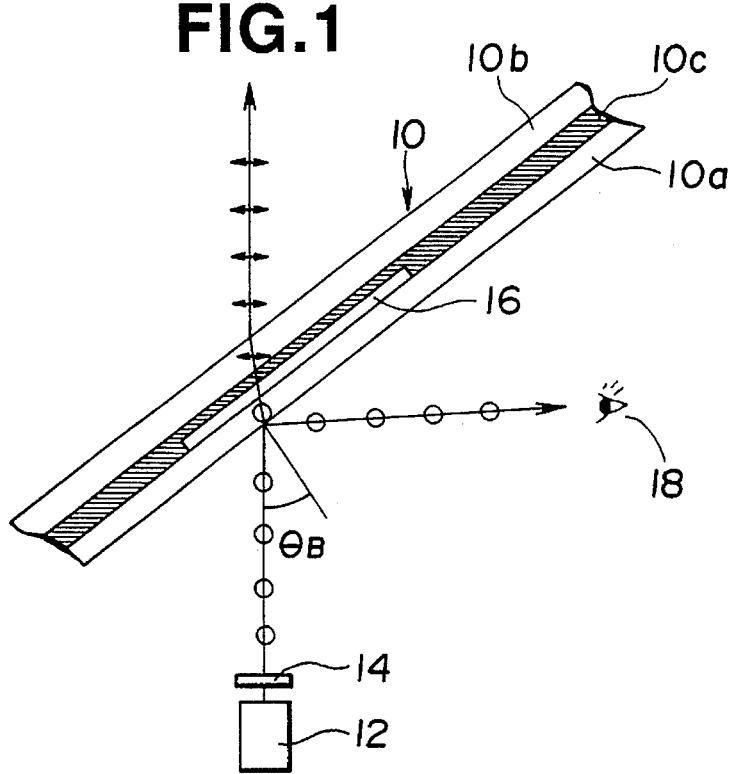
FIG. 1 is a diagrammatic illustration of a head-up display system according to a first embodiment of the present invention.

Referring to FIG. 1, a head-up display system according to a first embodiment of the present invention will be described in the following.

The head-up display system comprises a front windshield 10, a display 12, a S-wave polarizing member 14 and an optical rotatory film 16.

The front windshield 10 is made up of two glass sheets 10a, 10b and an intermediate film 10c (for example, polyvinyl butyral film) interposed therebetween. The optical rotatory film 16 is disposed between the inboard glass sheet 10a and the intermediate film 10c. However, if desired, it may be interposed between the outboard glass sheet 10b and the intermediate film 10c. If desired, two intermediate film are provided, and it may be interposed therebetween. If desired, it may be adhered to the inboard surface of the inboard glass sheet 10a. In this case, it is desired to coat the optical rotatory film with a plastic film.

Examples of the front windshield 10 are a conventional soda-lime glass sheet and a transparent resin glass sheet such as a polycarbonate resin sheet and an acrylic resin sheet. If desired, the front windshield may be a single glass plate which may be tempered according to the need. If the front windshield is a single glass plate, the optical rotatory film is fixed on the inboard surface of the front windshield.

The display 12 is disposed in such a manner that light therefrom is incident on the inboard surface of the front windshield at or nearly at Brewster's angle ($\theta_B = 56.3°$). Examples of the display 12 are a fluorescent display tube, C.R.T. and a liquid crystal display.

The S-wave polarizing member 14 is disposed between the front windshield 10 and the display 12 so that light from the display 12 is incident on the front windshield 10 after going through the polarizing member 14. If desired, the polarizing member 14 may be built in the display 12 to constitute a single unit. Light from the display 12, which has wavelengths ranging from 400 to 700 nm (visible light region) and includes S-wave and P-wave, is polarized by the S-wave polarizing member so that polarized light of only S-wave is incident on the inboard glass sheet. S-wave is an electric vector of which direction is perpendicular to the incidence plane to the front windshield. P-wave is an electric vector of which direction is parallel to the incidence plane to the front windshield. The polarized light of S-wave is partly reflected from the inboard glass sheet 10a toward the eyes 18 of a driver, and is partly transmitted through the inboard glass sheet 10a and incident on the optical rotatory film 16. Then, the light ray of S-wave is converted by the optical rotatory film 16 into light ray of P-wave. Then, the light ray of P-wave is incident on the outboard glass sheet 10b, transmitted therethrough, and goes out of the front windshield 10 without having any reflectance from the outboard surface of the outboard glass sheet 10b. Therefore, the double image problem does not occur in this case.

According to the present invention, the optical rotatory film 16 comprises a liquid crystal high polymer which is in twisted nematic orientation under the liquid crystal condition and in glassy condition at a temperature lower than its liquid crystal transition point. In other words, the liquid crystal high polymer is in twisted nematic orientation at a temperature higher than its glass transition point and in glassy condition at a temperature lower than its glass transition point. Any of liquid crystal high polymers having this characteristic can be used in the present invention. The liquid crystal high polymer has a liquid crystal transition point ranging from 0–150° C.

A method of preparing the optical rotatory film 16 will be described in the following.

Firstly, a liquid crystal high polymer is applied to a transparent substrate such as a transparent plastic film made of polyethylene terephthalate or the like. Then, shear force is applied to the coated substrate. After that, the coated substrate is heated and then cooled so as to fix liquid crystal orientation.

However, if desired, other steps may be taken to prepare the optical rotatory film 16. As an example, firstly, the liquid crystal polymer is applied to a transparent substrate. Then, electric field or magnetic field is applied to the coated substrate. Then, the coated substrate is heated and then cooled so as to fix liquid crystal orientation. As another example, firstly, an oriented film is formed on a transparent substrate. Examples of the oriented film are a rubbed polyimide film, a rubbed polyvinyl alcohol film or a film which is made by obliquely depositing silicon oxide. Then, the liquid crystal polymer is applied to the oriented film. Then, the coated substrate is heated and then cooled so as to fix liquid crystal orientation. If desired, the transparent substrate can be omitted. In this case, the optical rotatory film is a film of only the liquid crystal polymer. The optical rotatory film 16 has a thickness ranging from 0.5 μm to 20 μm, and more preferably from 1 μm to 15 μm.

Examples of the liquid crystal high polymer are main-chain type liquid crystal polymers such as polyester, polyamide, polycarbonate and polyesterimide which are optically active, and side-chain type liquid crystal polymers such as polyacrylate, polymethacrylate, polymalonate and polysiloxane which are optically active. Another example is a mixture of the main-chain type or the side-chain type liquid crystal polymer which is not optically active and an optically active low molecular weight compound or an optically active high polymer.

To be more concrete, a first example of the liquid crystal high polymer is represented by the following general formula (I):

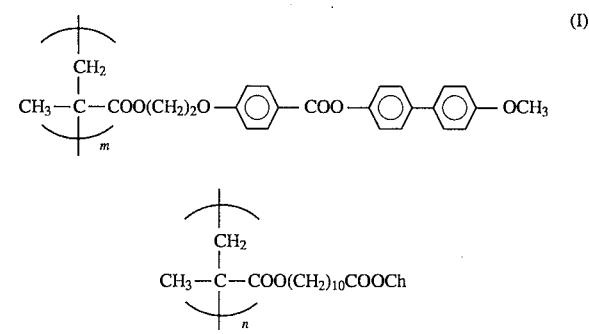

wherein m:n is usually from 99.9:0.1 to 80:20, and more preferably from 99: 1 to 95: 5, and wherein Ch is cholesteryl group which is represented by the following formula (II).

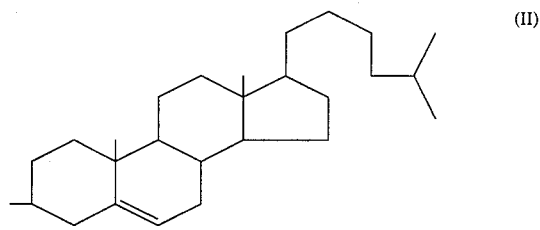

A second example of the liquid crystal polymer is represented by the following general formula (III):

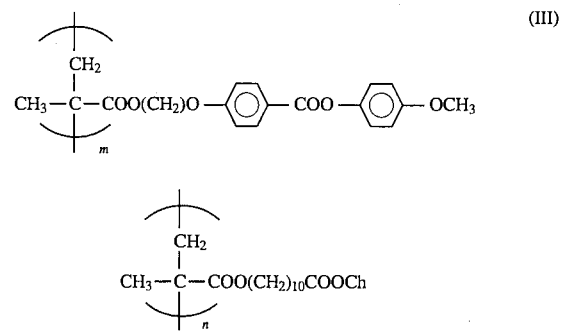

wherein m:n is usually from 99.9:0.1 to 80:20, and more preferably from 99:1 to 95:5, and wherein Ch is cholesteryl group which is represented by the above formula (II).

A third example of the liquid crystal high polymer is represented by the following general formula (IV):

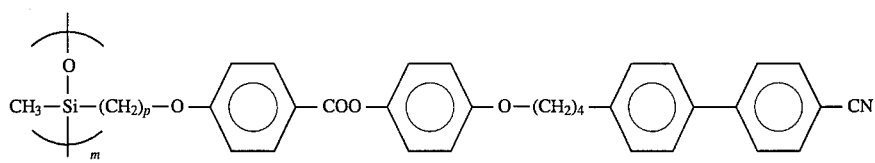
(IV)

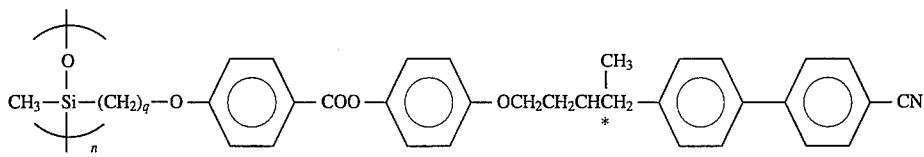

wherein m:n is usually from 99.9:0.1 to 70:30, preferably from 99.5:0.5 to 90:10 and more preferably from 99:1 to 95:5, wherein each of P and q is an integer ranging from 2 to 20, and wherein * represents optically active carbon.

A fourth example of the liquid crystal high polymer is represented by the following general formula (V):

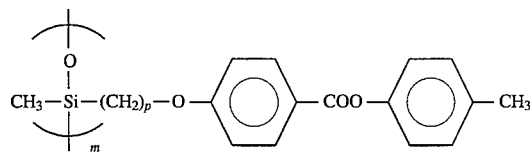
(V)

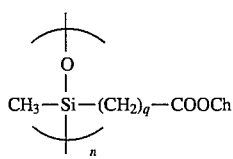

wherein m:n is usually from 99.9:0.1 to 70:30, preferably from 99.5:0.5 to 90:10 and more preferably from 99:1 to 95:5, wherein each of P and q is an integer ranging from 2 to 20.

A fifth example of the liquid crystal high polymer is represented by the following general formula (VI):

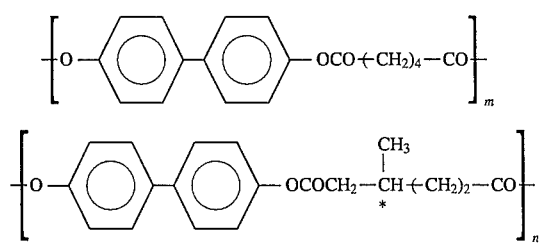
(VI)

wherein m:n is usually from 99.9:0.1 to 70:30, preferably from 99.5:0.5 to 90:10 and more preferably from 99:1 to 95:5.

A sixth example of the liquid crystal high polymer is represented by the following general formula (VII):

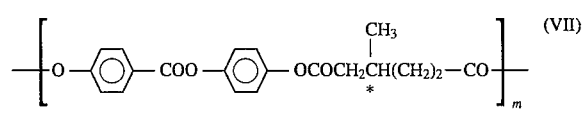
(VII)

-continued

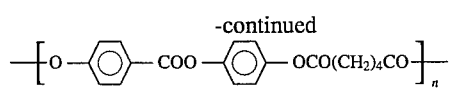

wherein m:n is usually from 0.5:99.5 to 10:90, and more preferably from 1:99 to 5:95.

A seventh example of the liquid crystal high polymer is represented by the following general formula (VIII):

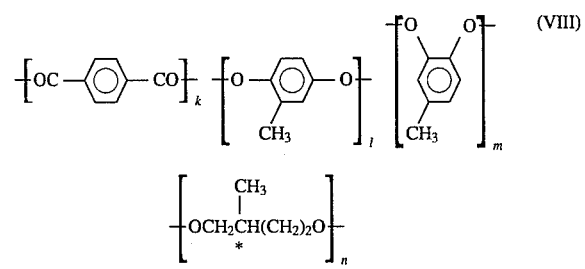
(VIII)

wherein k is the total of l, m and n, wherein k:n is from 99.5:0.5 to 90:10, and more preferably from 99:1 to 95:5, and wherein l:m is 5:95 to 95:55.

A eighth example of the liquid crystal high polymer is represented by the following general formula (IX):

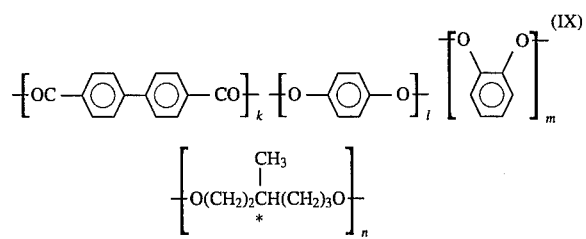
(IX)

wherein k is the total of l, m and n, wherein k:n is from 99.5:0.5 to 90:10, and more preferably from 99:1 to 95:5, and wherein l:m is 5:95 to 95:55.

A ninth example of the liquid crystal high polymer is a mixture of polymer (A) and polymer (B) represented by the following general formulas (X) and (XI), respectively:

(A)

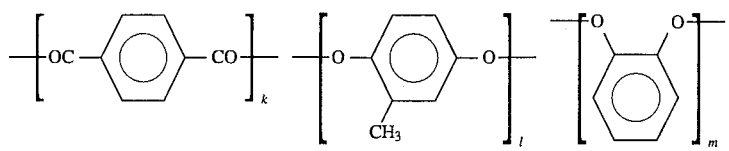

(X)

(B)

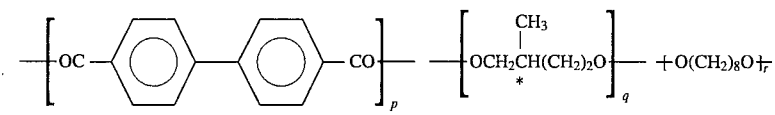

(XI)

wherein weight ratio of polymer (A) to polymer (B) is usually from 99.9:0.1 to 80:20, preferably from 99.5:0.5 to 85:15, and more preferably from 99:1 to 95:5, wherein k is the total of l and m, wherein l:m is from 75:25 to 25:75, wherein p is the total of q and r, and wherein p:q is 80:20 to 50:50.

A tenth example of the liquid crystal high polymer is a mixture of polymer (A) represented by the following general formula (XII) and polymer (B) which is cholesterylbenzoate:

(A)

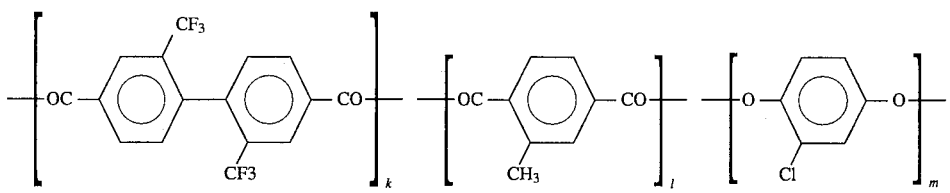

(XII)

wherein weight ratio of polymer (A) to polymer (B) is usually from 99.9:0.1 to 70:30, preferably from 99.5:0.5 to 80:20, and more preferably from 99:1 to 90:10, wherein m is the total of k and l, and wherein k:l is from 80:20 to 20:80.

An eleventh example of the liquid crystal high polymer is a mixture of polymer (A) and polymer (B) represented by the following general formulas (XIII) and (XIV), respectively:

(A)

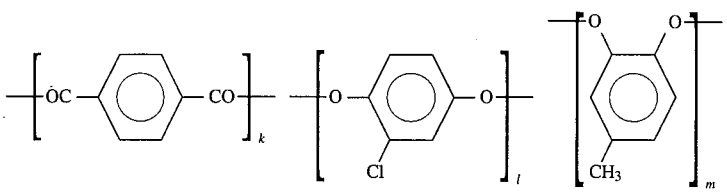

(XIII)

(B)

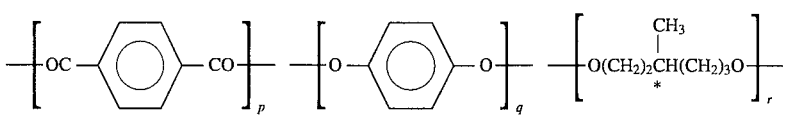

(XIV)

wherein weight ratio of polymer (A) to polymer (B) is usually from 99.9:0.1 to 70:30, preferably from 99.5:0.5 to 80:20, and more preferably from 99:1 to 90:10, wherein k is the total of l and m, wherein l:m is from 25:75 to 75:25, wherein p is the total of q and r, and wherein p:r is 60:40 to 80:20, and wherein * represents optically active carbon.

Inherent viscosity of the liquid crystal high polymer is preferably from 0.05 to 3.0, and more preferably from 0.07 to 2.0 when it is measured at a temperature of 30° C., with using a solvent such as tetrahydrofuran or acetone, or a solvent mixture of, for example, phenol and tetrachloroethane (60:40). If inherent viscosity is smaller than 0.05, the liquid crystal high polymer becomes weak in strength. If it is larger than 3.0, viscosity upon liquid crystal formation becomes too high, thereby lowering the degree of orientation and taking too much time for orientation.

Figure 2:
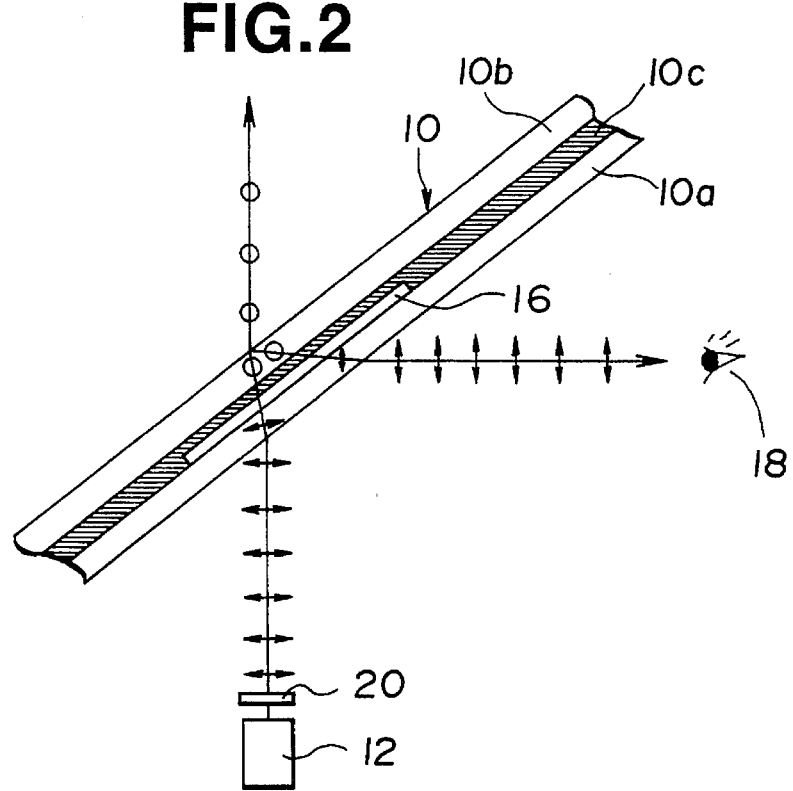
FIG. 2 is a diagrammatic illustration similar to FIG. 1, but showing a head-up display system according to a second embodiment of the present invention.

Referring to FIG. 2, a head-up display system according to a second embodiment will be described in the following.

Parts and constructions which are substantially the same as those of the first embodiment are denoted by the same numerals and detailed explanation of them will be omitted from the following description.

In this embodiment, the head-up display system comprises a P-wave polarizing member 20 instead of the S-wave polarizing member of the first embodiment. Light from the display 12, which has wavelengths ranging from 400 to 700 nm (visible light region) and includes S-wave and P-wave, is polarized by the P-wave polarizing member 20 so that polarized light of only P-wave is incident on the inboard glass sheet 10a. It should be noted that the polarized light of only P-wave is not reflected from the inboard glass sheet 10a. Therefore, the total of light ray of P-wave is transmitted through the inboard glass sheet 10a and incident on the optical rotatory film 16. Then, the light ray of P-wave is converted by the optical rotatory film 16 into light ray of S-wave. Then, the light ray of S-wave is incident on the outboard glass sheet 10b, transmitted therethrough, and partly goes out of the front windshield 10 and partly is reflected from the outboard surface of the outboard glass sheet 10b. Then, the reflected light of S-wave is transmitted through the outboard glass sheet 10b and again incident on the optical rotatory film 16. Then, the light ray of S-wave is converted by the optical rotatory film 16 into light ray of P-wave. Then, the light ray of P-wave is transmitted through the inboard glass sheet 10a, and goes out of the front windshield 10 toward the eyes 18 of the driver.

A head-up display system according to the present invention can be installed in a vehicle, a train and an airplane. Furthermore, it can be used for a decorative purpose.

The optical rotatory film may be used with a conventional reflective film in a head-up display system according to the present invention.

Figure 3:
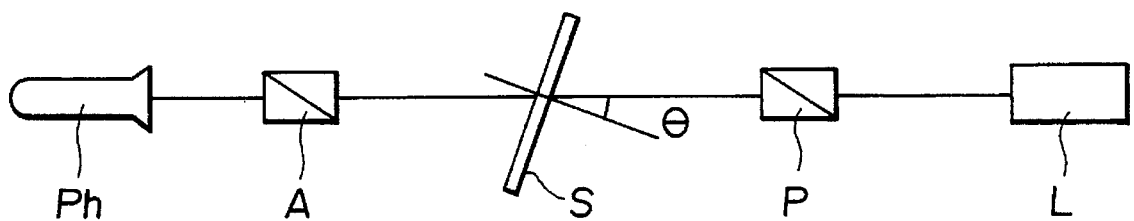
FIG. 3 is a diagrammatic illustration showing a device to measure optical rotatory power of a conventional $\lambda/2$ film and of an optical rotatory member according to the present invention.
Figure 4:
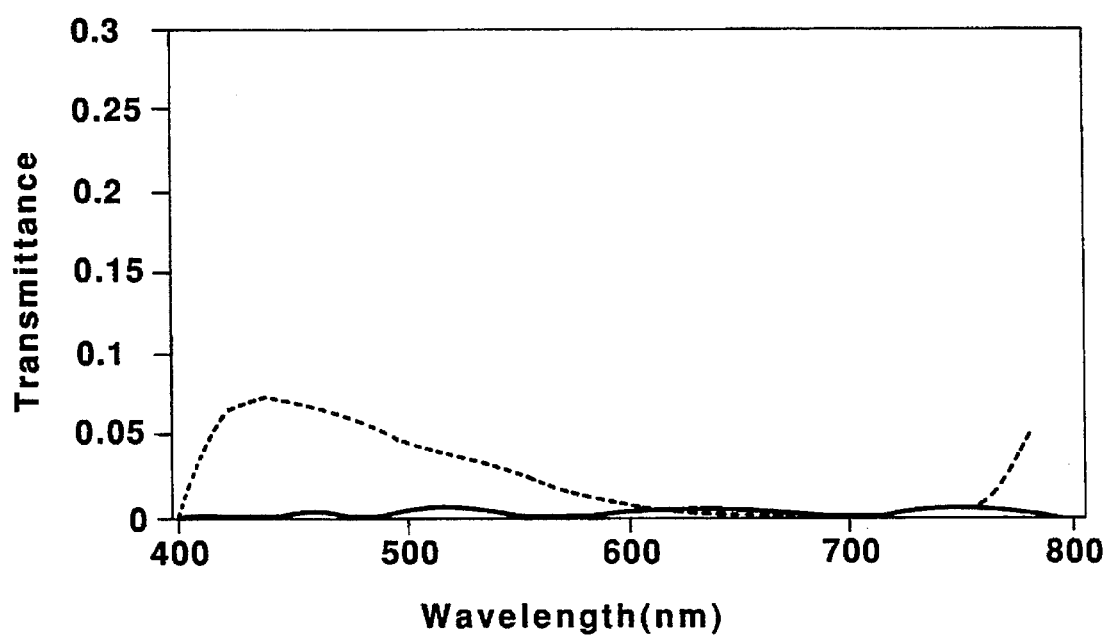
FIG. 4 is a graph showing the relationship between transmittance and wavelengths, which is determined by the device shown in FIG. 3, with respect to a conventional $\lambda/2$ film and an optical rotatory member according to the present invention.

In the following, optical rotatory power of a conventional $\lambda/2$ film and of an optical rotatory film according to the present invention will be compared. For the comparison, a device which is shown in FIG. 3 was used. The device comprises a light source L, parallel nicols P and A, and a spectrophotometer Ph. A sample S, i.e. the $\lambda/2$ film or an optical rotatory film according to the present invention was interposed between the parallel nicols P and A. In the measurement, light from the light source L, which has wavelengths ranging from 400 to 750 nm, was transmitted through the parallel nicol P, incident on the sample S at an incident angle ($\theta$) of 8°, transmitted through the parallel nicol A, and incident on the spectrophotometer Ph. Light transmittance was measured by the spectrophotometer Ph. The result is shown in FIG. 4 in which the dotted line and the solid line are of the $\lambda/2$ film and of an optical rotatory film according to the present invention, respectively. It is understood from FIG. 4 that the $\lambda/2$ film acts as an effective optical rotatory member to rotate, by 90°, the plane of polarization of polarized light having wavelengths ranging from 600 to 700 nm. However, the $\lambda/2$ film shows a high transmittance for light having wavelengths less than 600 nm. That is, the $\lambda/2$ film is inferior in optical rotatory power for light having wavelengths less than 600 nm. On the other hand, an optical rotatory film according to the present invention shows a transmittance of nearly zero throughout wavelengths from 400 to 800 nm. This means that an optical rotatory member according to the present invention acts as a superior 90° rotatory member for light having wavelengths from 400 to 800 nm, thereby eliminating the double image problem.

What is claimed is:

1. A display system comprising:

a glass plate;

means for displaying an image on said glass plate to be viewed by a viewer of said image, said displaying means being disposed such that light therefrom is incident on said glass plate at an angle which is substantially equal to Brewster's angle;

means for polarizing light from said displaying means, said polarizing means being disposed between said glass plate and said displaying means; and an optical rotatory film for rotating a plane of polarization of light polarized by said polarizing means, said optical rotatory film being installed on said glass plate, said optical rotatory film comprising a liquid crystal high polymer which is in twisted nematic orientation at a temperature which is higher than glass transition point thereof and is in glassy condition at a temperature which is lower than said glass transition point.

2. A display system comprising:

a glass plate;

means for displaying an image on said glass plate to be viewed by a viewer of said image, said displaying means being disposed such that light therefrom is incident on said glass plate at an angle which is substantially equal to Brewster's angle;

means for polarizing light from said displaying means, said polarizing means being disposed between said glass place and said displaying means; and an optical rotatory film for rotating a plane of polarization of light polarized by said polarizing means, said optical rotatory film being installed on said glass plate, said optical rotatory film comprising a liquid crystal high polymer which is in twisted nematic orientation under liquid crystal condition and is in glassy condition at a temperature which is lower than liquid crystal transition point thereof.

3. A display system according to claim 2, wherein said glass plate is made up of a laminated glass pane including an inboard glass sheet, an outboard glass sheet and an intermediate film disposed therebetween, said optical rotatory film is installed between said inboard and outboard glass sheets.

4. A display system according to claim 3, wherein said optical rotatory film is installed between said inboard glass sheet and said intermediate film.

5. A display system according to claim 2, wherein said polarizing means is a S-wave polarizing member.

6. A display system according to claim 2, wherein said polarizing means is a P-wave polarizing member.

7. A display system according to claim 2, wherein said liquid crystal high polymer has a inherent viscosity ranging from 0.05 to 3.0 at a temperature of 30° C.

8. A display system according to claim 2, wherein said optical rotatory film has a thickness of 0.5 μm to 20 μm.

9. A display system according to claim 8, wherein said optical rotatory film has a thickness of 1 μm to 15 μm.

10. A display system according to claim 2, wherein said glass plate is a front windshield of a vehicle, and said viewer is a driver of said vehicle.

* * * * *